United States Patent
Dunmire

[15] 3,687,490
[45] Aug. 29, 1972

[54] PIPE SADDLE ASSEMBLY
[72] Inventor: Paul G. Dunmire, Oakland, Calif.
[73] Assignee: Christy Metal Products Inc., Emeryville, Calif.
[22] Filed: May 18, 1970
[21] Appl. No.: 38,342

Related U.S. Application Data

[63] Continuation-in-part of Ser. No. 826,563, May 21, 1969, abandoned.

[52] U.S. Cl..................................285/197, 251/146
[51] Int. Cl. ..........................F16l 41/00, F16k 51/00
[58] Field of Search .......251/146; 285/197, 198, 199

[56] References Cited

UNITED STATES PATENTS

| | | |
|---|---|---|
| 1,459,030 | 6/1923 | Mueller......................285/199 |
| 3,298,717 | 1/1967 | Rothwell et al............285/197 |
| 556,489 | 3/1896 | Coburn......................285/197 |
| 2,703,721 | 3/1955 | Montgomery.............285/197 |
| 2,997,316 | 8/1961 | Recht.....................285/197 X |
| 3,503,416 | 3/1970 | Clarkson................251/146 X |

Primary Examiner—William R. Cline
Attorney—Flehr, Hohbach, Test, Albritton & Herbert

[57] ABSTRACT

A pipe saddle assembly employing a flexible strap adapted to be disposed about a pipe into which a branch line is to be made. The saddle assembly includes lugs cooperating with the ends of the band and bolts for drawing the lugs together to tension the band. The bolts ride on fulcrums supported by a boss element to be drawn against the pipe. A seal ring interposed between the boss element and pipe seals against leakage.

20 Claims, 26 Drawing Figures

INVENTOR.
PAUL G. DUNMIRE

INVENTOR.
PAUL G. DUNMIRE

INVENTOR.
PAUL G. DUNMIRE

INVENTOR.
PAUL G. DUNMIRE

INVENTOR.
PAUL G. DUNMIRE

FIG. 26

PIPE SADDLE ASSEMBLY

CROSS-REFERENCE TO RELATED APPLICATIONS

This application is a continuation-in-part of the copending application entitled PIPE SADDLE ASSEMBLY, Ser. No. 826,563, filed May 21, 1969, now abandoned.

BACKGROUND OF THE INVENTION

This invention pertains to pipe saddle assemblies of a type for making a branch line connection from a "main line" to a service line or other run of pipe and is particularly useful with respect to applications in the water works field. As is known, pipe saddles are usually attached to the main line prior to piercing the main line to form a branch line outlet. The saddle assembly then remains in place.

Pipe saddles heretofore have presented a number of problems which the industry has long sought to correct. For example, some pipe saddle assemblies are subject to placing undue strain on the back side of the pipe when the assembly is tightened about the pipe so as to crush the back side of the pipe. Other designs purport to "wrap around" the pipe, contacting it at four spaced points to avoid crushing it by pressures applied merely at top and bottom. These types of saddles are generally limited to a single given size of pipe and, therefore, there must be maintained a rather large inventory of saddles in order to accommodate the conventional wide range of pipe sizes. Also, this "wrap around" design requires an inordinate amount of tension on the bolts or straps in order to effect a seal between the saddle and pipe to which it is affixed.

In addition, where saddle assemblies of a type adapted to accommodate a wide range of pipe sizes have been tried in the past, difficulty has been found in applying compressive forces directly to the sealing gasket and this has resulted in an indispensable seal formed about the transverse opening tapped into the service line. Thus, saddles heretofore have been at times ineffective in preventing undesirable leaking at the branch line connection and, therefore, certain types have not generally been accepted in the trade.

In addition to the above, many prior art saddle assemblies have been characterized by an undue multiplicity of parts which has caused problems of maintaining proper inventory for a number of sizes as well as inordinate expense in manufacture of these saddle assemblies.

In addition to the above, prior pipe saddle assemblies have typically been unhandy and awkward to install in the locations usually encountered in typical installations. Thus, for example, it is not uncommon to find that the take-up bolts and other works of the assembly will necessarily be located at the back of the pipe to which the saddle is being attached. Such an arrangement though common, contributes to an improperly applied saddle which later leaks and calls for experienced personnel to make proper installation.

As disclosed herein, the entire works of the saddle assembly have been collected at the general region of the saddle outlet forming the branch line connection whereby all the working parts of the assembly are readily accessible to view during installation by a worker.

Also, as disclosed herein, a saddle or hub member is provided suitable for a wide range of pipe sizes. Unique means are employed so as to press the saddle straight against a seal ring lying against the wall of the pipe while uniformly distributing the applied pressure around the seal ring.

Thus, the above means permits the saddle to align its undersurface to the pipe run, and equalizes the seal ring pressures around the branch line hole.

While lugs have heretofore been employed in the attachment of certain assemblies to a run of pipe, lugs are provided herein adjacent the saddle or hub member in a manner which serves to stabilize the hub member on the pipe run. In addition, the tensioning forces employed to attach the saddle assembly to the pipe run are evenly distributed around the pipe.

Further, in one embodiment a simple pipe connection is made to the saddle with the lugs and bolts serving to retain the connection between saddle and pipe.

SUMMARY OF THE INVENTION AND OBJECTS

According to the present invention, a pipe saddle assembly has been provided for making tightly sealed connection to a fluid passage formed transversely into a pipe line. The assembly is characterized by a flexible band which is strapped around the pipe. The ends of the band or strap are disposed adjacent to the branch outlet position. A saddle or hub member for receiving the branch line is located between the ends of the strap. Readily attachable tensioning means for interconnecting the ends of the strap extend across fulcrum elements disposed on diametrically opposite sides of the hub member, and means are provided for tightening the strap so as to draw the hub tightly against a seal interposed between the hub and the pipe to provide a pressure-tight joint from the "main line" to the transverse "branch." In one embodiment the fulcrum elements are formed directly on the hub member, and in another embodiment the fulcrum elements are formed on the end of a pipe and disposed within the hub member.

By utilizing the fulcrum elements as herein to be described, the tensioning forces will be evenly taken up on both sides of the hub.

In general, it is an object of the present invention to provide an improved pipe saddle assembly.

Another object of the invention is to make a branch line connection to a service line or other run of pipe by improved and simplified means for providing a better, more reliable seal than heretofore.

Another object of the invention is to provide the above connection for a wide range of pipe sizes at minimum cost and complexity using a single common size unit for all pipe within a wide range.

Another object of the invention is to provide the above branch connection by means more easily installed than heretofore, with a safety factor allowing for "human errors."

Still a further object of the invention is to provide the above versatile connection by means disposed entirely outside the pipe whereby no obstructing entry into the flow passage of the service line is required.

These and other objects of the invention will become more clearly apparent from the following detailed description of preferred embodiments according to the invention.

DESCRIPTION OF THE PREFERRED EMBODIMENTS

Figure 1:
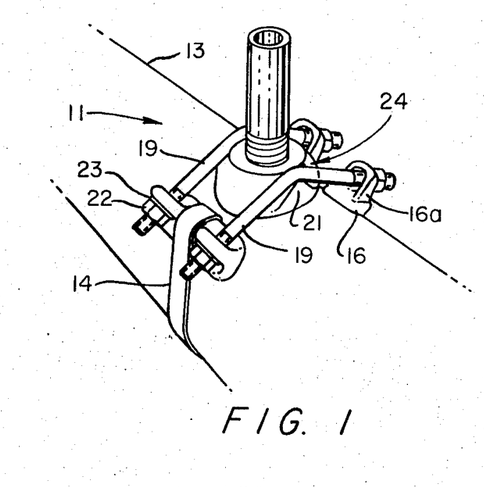
FIG. 1 is a schematic perspective view showing a pipe saddle assembly according to the invention.

According to one preferred embodiment, a pipe saddle assembly 11 for making a tightly sealed connection to a fluid passage 12 to be later formed transversely into a pipe line 13 or other run of pipe, comprises an elongated flexible strap 14, preferably of stainless steel or other corrosion resistant material having considerable strength and flexibility. During installation, strap 14 is simply passed behind pipe line 13 whereby the ends of strap 14 may be attached at a convenient location in the general region of the branch connection.

Figures 4, 5, 6:
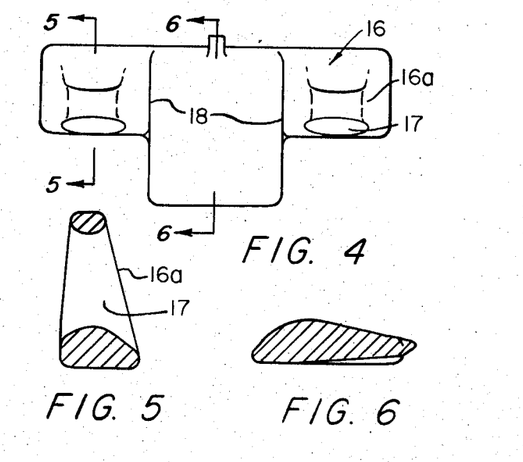
FIG. 4 is a plan view of a component of the structure shown in FIG. 1.
FIGS. 5 and 6 are elevation section views taken along the lines 5—5 and 6—6 respectively of FIG. 4.

Means for interconnecting the ends of strap 14 include lugs 16. Each lug is formed as by casting to include a pair of outwardly projecting bolt-receiving take-up portions 16a which flank a band-attaching portion 16b provided on its undersurface with a shallow recess 16c between the flat undersurfaces 16d of the shoulder portions 17. Further, a projecting nib 18 extends from the leading edge of portion 16b to engage one of several detent holes 20 formed centrally along the ends of strap 14.

Figure 2:
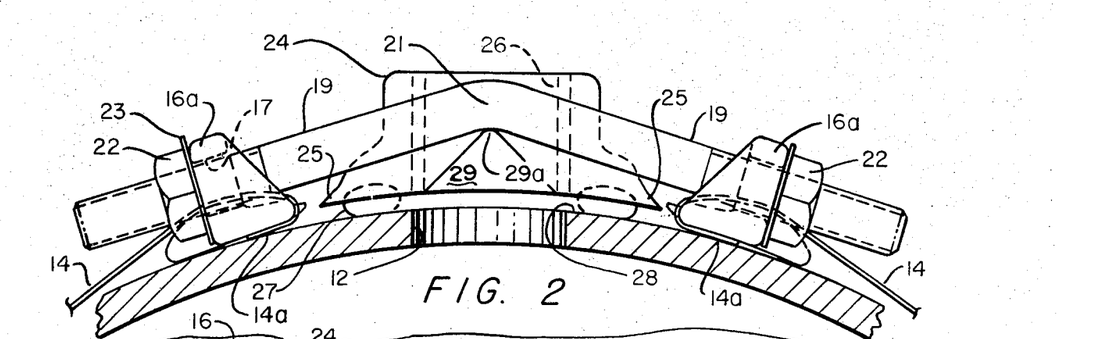
FIG. 2 is an end elevation view of the structure shown in FIG. 1.
Figure 3:
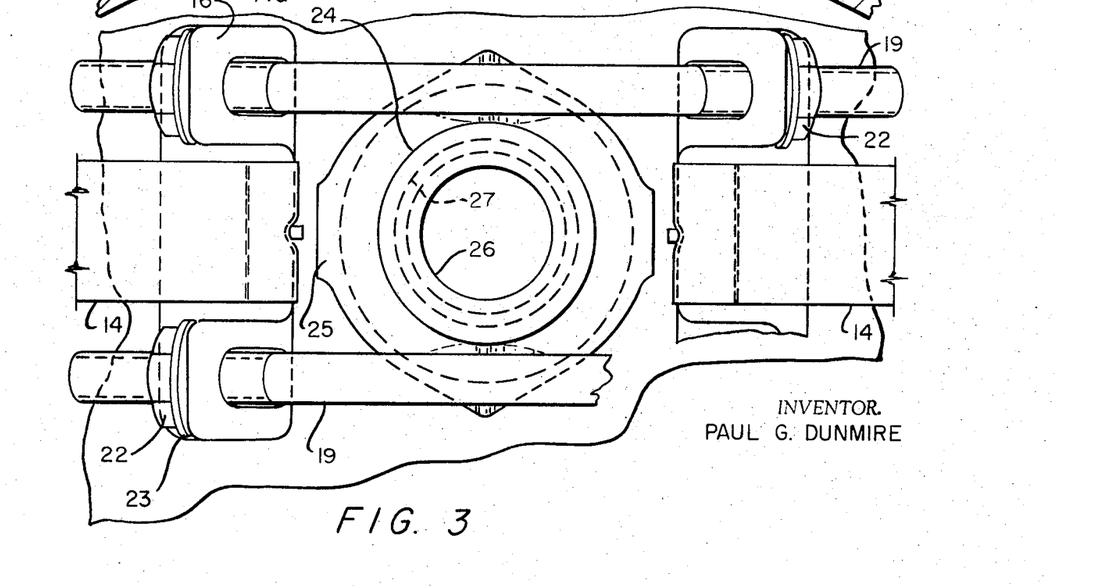
FIG. 3 is a plan view of a portion of FIG. 2.

Thus, the ends of strap 14 are bent to conform to the rounded contour of the leading edge of lugs 16 and the extreme end portions 14a (FIG. 2) of strap 14 lie in recess 16c. When tightened, by means of the bolts 19, the flat undersurfaces 16d disposed laterally at the sides of strap 14, ride on the pipe surface and stabilize the leading edge of lug 16 and the strap in the region of saddle member 24.

The gradually diminishing depth of recess 16c serves to cause the trailing end of strap 14 to become pinched between the outer pipe wall and the undersurface of lug portion 16b to ensure against loss of engagement of the strap.

The function and tightening action produced by bolts 19, 21 is described further below in conjunction with the saddle or hub unit 24 and fulcrum elements 29, 31 formed at the sides thereof.

Figure 7:
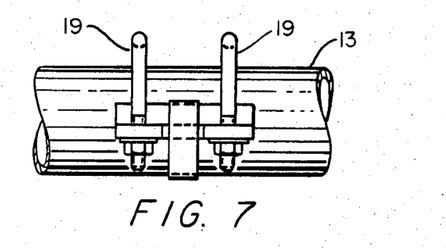
FIGS. 7 and 8 are side elevation views demonstrating the sequence of application of the pipe saddle assembly to a run of pipe.
Figure 8:
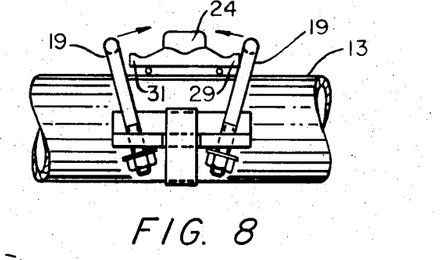

For the moment however as shown in FIG. 7, it will be readily apparent that, preliminarily, strap 14 can be attached about pipe 13 with bolts 19, 21 being located at the sides of the location for the proposed branch passage 12. In order to make a fluid-tight branch line connection to passage 12, a saddle unit 24 formed with a threaded flow passage 26 is positioned in alignment with the position of the proposed passage 12. The undersurface of unit 24 compresses a resilient sealing gasket, such as the O-ring 27, against the annular margin 28 of the pipe surface encircling the region of the proposed fluid passage 12.

Rigid fulcrum elements 29, 31 formed with a relatively sharp fulcrum edge such as 29a are carried by unit 24 whereby bolts 19, 21 can be readily first connected to the ends of strap 14 and then easily moved onto the fulcrum elements. Thereafter, nuts 22 can be tightened to tension strap 14 about pipe 13 causing seal 27 to be compressed between unit 24 and pipe 13.

The tightening of strap 14 by means of nuts 22 acts upon unit 24 via the fulcrum elements 29, 31 so as to localize the application of forces to unit 24 while evenly distributing compressive forces about the pipe periphery throughout a large portion of the relatively long length of strap 14. Pressure applied by the bolts to the fulcrum points forces unit 24 against the pipe, permitting the saddle unit to rock and adjust to the pipe surface to distribute the pressure evenly to the gasket and pipe.

Thus, in the above manner of applying compressive forces to unit 24, each of bolts 19, 21 can be individually tightened whereby, in the event that a leak should occur between seal 27 and the surface of pipe 13, unit 24 can be tipped slightly in a longitudinal direction to close the leak merely by tightening one or the other of the two bolts 19, 21.

Thus, the fulcrum elements preferably lie substantially along an extension of the opposite ends of a diameter of the flow passage 26 and in a plane including the axis of the pipe.

In operation, it has been observed that the foregoing arrangement provides an improved means for applying pressure to the sealing gasket 27 whereby the forces of compression are evenly distributed about the gasket seal by acting directly downwardly against the fulcrum edge 29a. If the seal is tighter at one end of unit 24 along the pipe run than at the other, it is a simple mater to take up the slack on the other bolt by merely tightening the nuts 22.

Further, since the bolts will rock upon their respective fulcrum elements, the take-up tension will be evenly applied to both ends of strap 14.

Saddle unit 24 is formed to include a pair of rigid ramp portions 25 adapted to lie closely adjacent the surface of the pipe at a level to intercept nib 18 and deflect the leading edge of its associated lug 16 to ride upwardly against the inclined surface of the ramp 25.

In the usual circumstance, nib 18 will not reach ramp 25. However, in those circumstances where it does, the engagement of the leading edge of the lug with the ramp will develop a moment tending to tip the lug toward unit 24 thereby quickly taking up additional slack in strap 14.

Figure 9:
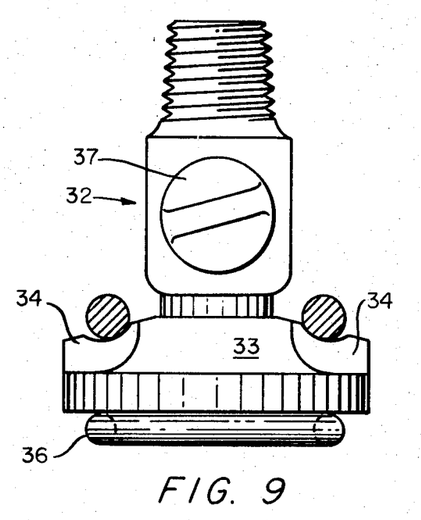
FIG. 9 is a side elevation view partly in section according to another embodiment of the invention.

Referring to FIG. 9, there is shown another embodiment according to the invention utilizing the structure referred to above but wherein there is combined a corporation stop 32 or other similar type valve means formed in integrated, fixed relation to a saddle unit portion 33 equipped, as above, with fulcrum elements 34, O-ring seal 36 and a valve control cock 37. In this manner the saddle and stop have a very low profile and are readily usable with a wide range of pipe sizes. While not shown, it will be readily apparent from the above that the valve means can be disposed in a right angle elbow configuration as well as in the vertical configuration shown.

From the above, it will be readily apparent that the saddle assembly described above can be readily applied to a wide range of pipes with considerable convenience derived from the fact that the attaching and tightening mechanism is all located in the general region of the branch line outlet.

In tightening the saddle assembly by means of nuts 22, it should be observed (as noted above) that the undersurfaces of lugs 16 are formed to permit the lugs 16 to slide on the outer wall of the pipe. Ultimately, the folded-under ends 14a of strap 14 become tightly pinched between the lugs and the pipe even though sliding may continue.

Figure 23:
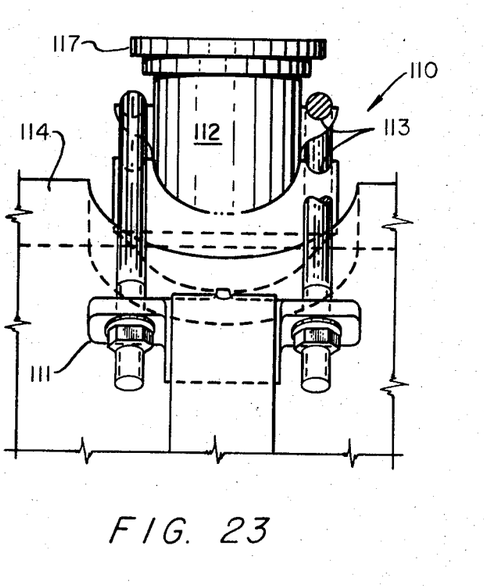
FIG. 23 is a side elevation view partly broken away showing another embodiment according to the invention.

A flanged outlet style of saddle assembly characterized by a plurality of stages of fulcrum elements is shown in FIG. 23 for use with cement-coated pipes, for example, or other pipes formed with a relatively thick coating of other types of material. In such types of pipe, where a branch line connection is to be made, a hole is first cut into the coating and the coating material removed down to the metal or other pipe material.

Thus, in FIG. 23, a flanged outlet assembly 110 comprises the lugs 111 as described above and a saddle unit 112. A plurality of rigid fulcrum elements 113 is formed on the extensions of a common diameter of unit 112 extending along the length of a coated pipe 114. Two bolts 116, as described above, are disposed to extend across a pair of elements 113 on opposite sides of unit 112 and at a common level.

Where the coating on pipe 114 is particularly thick, the uppermost elements 113 will be employed due to the extent to which unit 112 must penetrate the coating before resting on the metal pipe enclosed by the coating.

Branch line connection can be readily made by bolting the flange of a coupling to the flange 117 formed on the outer end of unit 112.

The above embodiment accommodates not only a wide range of pipe diameter sizes, but also various types and thicknesses of coated pipe.

Figure 10:
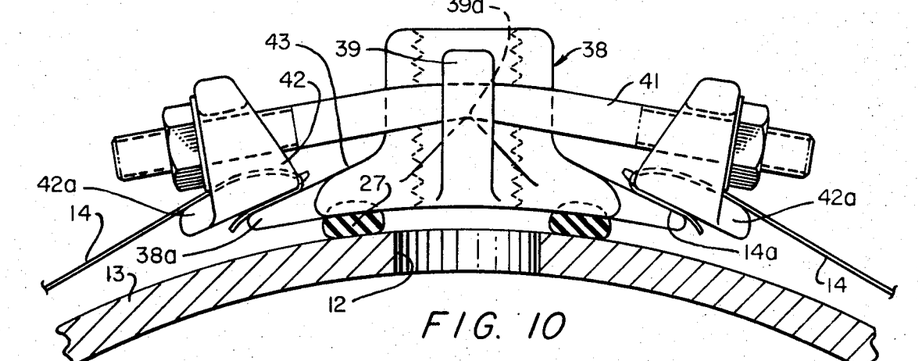
FIG. 10 is an end elevation view according to another embodiment of the invention.
Figure 11:
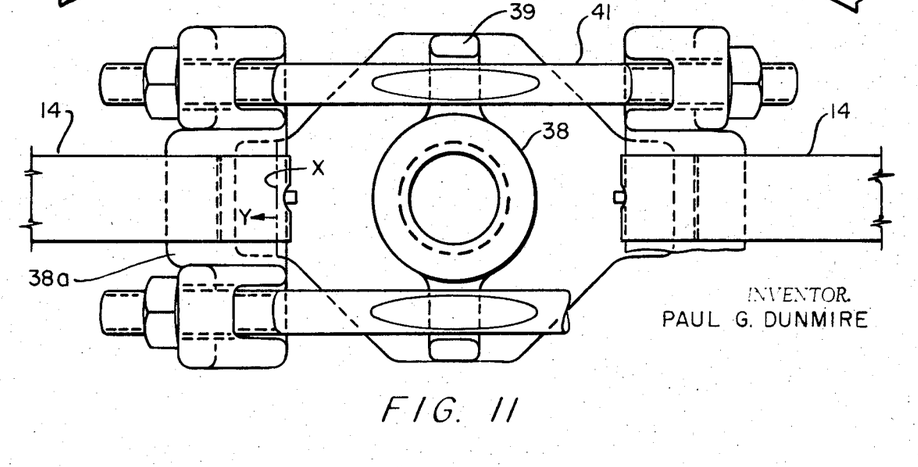
FIG. 11 is a plan view of a portion of FIG. 10.

With reference to FIGS. 10 and 11, another embodiment of the invention is disclosed wherein means have been provided for pressing the saddle unit against the pipe from additional locations midway between the fulcrum elements and at the sides of the saddle unit. This is accomplished while retaining the underfolded ends of strap 14 in a position bearing directly against laterally enlarged ramp portions of the saddle unit.

This embodiment therefore not only has the additional advantage of applying a sealing force to the saddle unit from four equally spaced positions around the seal ring, but also affects tensioning of the flexible band or strap at a quickened rate once the lugs start upwardly along the ramp portions, due to the increased angle of incline which the lug must follow as it is taken up.

Thus, as shown in FIG. 10, a saddle unit 38 is prepared, as above, with rigid fulcrum elements 39 formed with a relatively abrupt fulcrum edge 39a across which bolts 41 are laid.

Closely adjacent the bottom of unit 38, a pair of flared portions 38a extend laterally of the axis of pipe 13.

The upper surface of the two portions 38a provides an inclined ramp or wedging surface on opposite sides of unit 38 at positions lying intermediate the fulcrum elements 39.

The end portion 14a of strap 14 is held by lugs 42 against the inclined wedge surfaces 43. Initially, as the lugs 42 are drawn together by tightening bolts 41, the ends 14a of strap 14 slide relatively loosely along the wedge surface region x (Noted in FIG. 11). Thus, the strap ends are well up on the ramp or wedge surface 43 of portions 38a before the tension in strap 14 becomes substantial. Thereafter, in the y region the ends of the strap will be pinched with great security between the undersurface of the lugs 42 and portions 38a.

In the event that the leading edge of the lugs 42 should reach the upper end of surfaces 43, further tightening of the bolts 41 will rock lugs 42 about their leading edges so as to tend to lift the rear portions 42a of lugs 42. This action, of course, produces a rapid take-up in strap 14 for a very slight increase in the tightening of bolts 41.

The above arrangement serves to apply a localized sealing force to unit 38 via the aforementioned wedging portions 38a. This aids in evenly compressing seal 27 against the pipe surface. Thus, in so providing the additional compression at a position intermediate the fulcrum elements 39, points of compressive force are defined at four equally spaced positions around the sealing gasket or O-ring 27.

Figure 12:
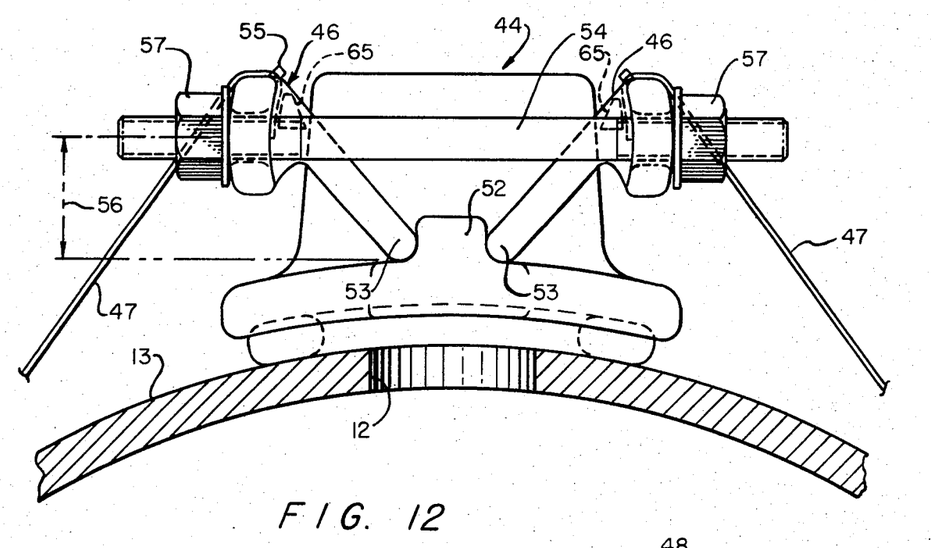
FIG. 12 is an end elevation view according to another embodiment of the invention.
Figure 13:
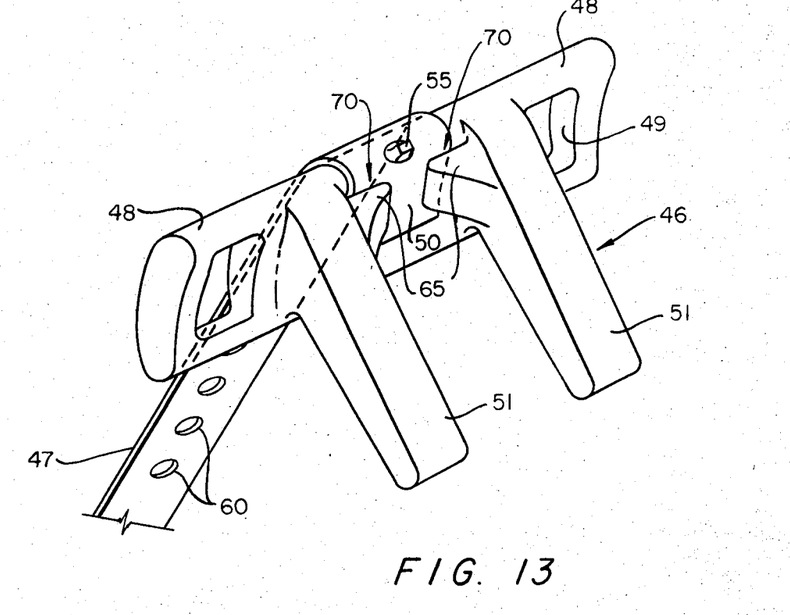
FIG. 13 is a perspective enlarged detailed view of a component portion of FIG. 12.
Figure 24:
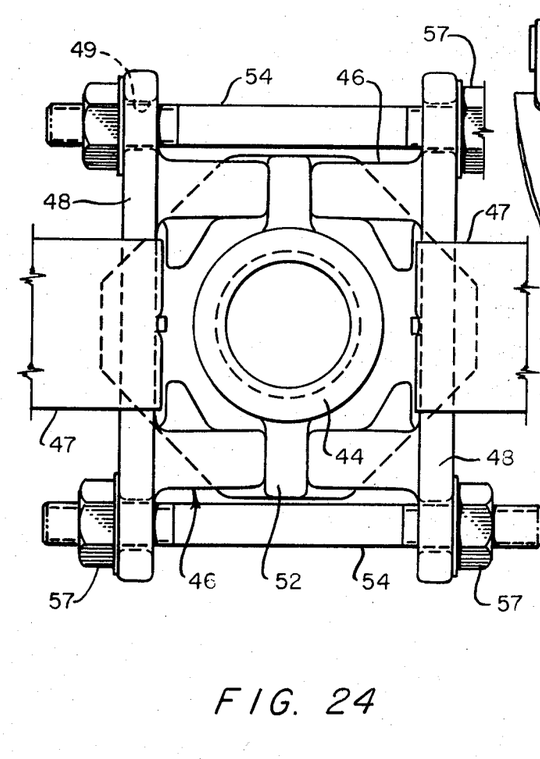
FIG. 24 is a plan view of FIG. 12.

A further embodiment, according to the invention, is shown in FIGS. 12, 13 and 24 wherein localized compressive forces are applied substantially along the extensions of a diameter of the flow passage formed through an annular seal ring of a saddle unit, such as the unit 44 shown in FIG. 12.

In the embodiment shown in FIG. 12, lugs 46 are coupled to folded-over ends 50 of strap 47. The upper edge of lug 46 seats snugly within the U-shaped end 50. As before, a nib 55 protrudes through one of a series of locking holes 60 to establish the proper length of strap 47.

Lugs 46 have a pair of laterally outer portions 48 formed with bolt-receiving passages 49 therethrough.

Lugs 46 are formed to include a pair of downwardly extending pivot arms 51 for engaging the rigid elements 52 formed integral with the base portion of saddle unit 44 so as to rotate or pivot from their ends 53.

Adjustable elongated bolts 54 extend between the lugs 46 and employ nuts at their opposite ends for drawing the two lugs toward each other so as to tighten the strap 47 while the pivot ends 53 of arms 51 apply compressive forces locally to the saddle unit in the region of the rigid abutment elements 52.

From the above it is apparent that the embodiment shown in FIGS. 12 and 13 does not require the use of the angularly deformed bolts 19, 21 as shown in FIG. 1 and also introduces an advantageous mechanical advantage provided by means of the lever arm defined by the displacement 56 (in phantom lines) resulting from the angular orientation of pivot arms 51. By employing this lever arm, less force is required to take up the nuts 57 on bolts 54.

Having in mind the foregoing construction, it is readily evident that the lengths of a strap, such as the straps 14, 47, discussed above, will not be particularly critical. Accordingly, the ends may be folded over as desired in the field when making a particular installation.

To aid in securing the ends of strap 47 to lugs 46, rigid retainer stubs 65 are cast integral with pivot arms 51 to be positioned in confronting spaced relation while forming a gap 70 through which the folded end of strap 47 can be inserted before or after bending over the ends.

Figures 14, 15:
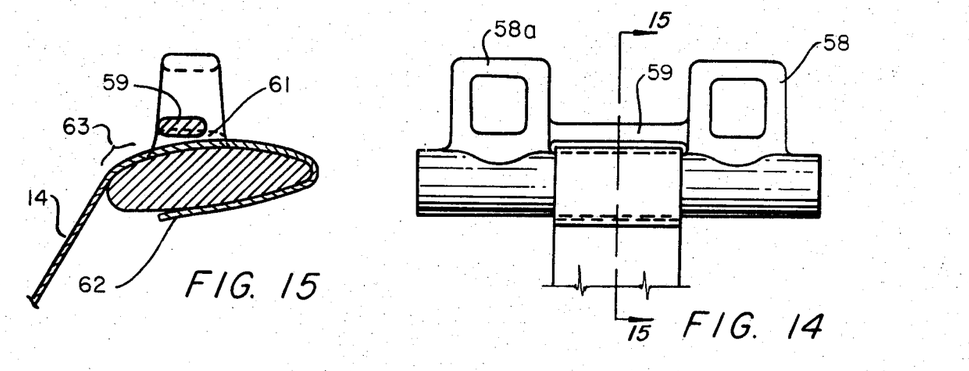
FIGS. 14 and 15 are respectively front and end elevation views, FIG. 15 being in section taken along the line 15—15 of FIG. 14.

Referring to FIGS. 14 and 15, there is shown a lug 58 for use with the other embodiments and which is particularly designed to aid in the bending or folding under of the ends of straps 14.

Accordingly, lug 58 includes between the outwardly protruding bolt-receiving portions 58a a transversely extending bar 59 spaced slightly above the upper surface of the main body of lug 58. Accordingly, a gap or slot 61 has been defined to receive and confine the end of the strap, such as strap 14, and upon bending the end 62 of the strap around the body of lug 58, the trailing portion 63 will rise only slightly until it strikes the transverse bar 59 thereby aiding in retaining the strap to conform to the contour of the upper surface of lug 58.

Figure 16:
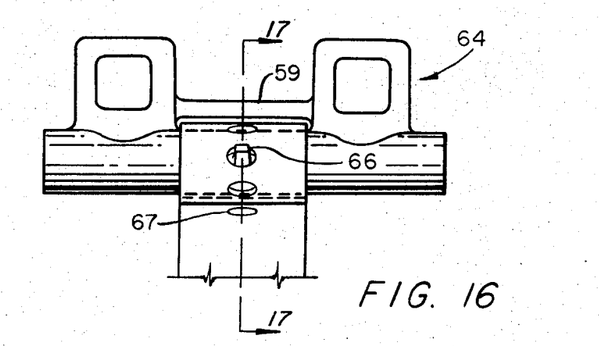
FIGS. 16 and 17 are respectively front and end elevation views, FIG. 17 being in section taken along the line 17—17 of FIG. 16.
Figure 17:
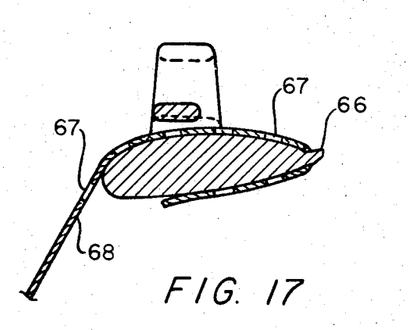

In addition to the above, a further improved lug 64 has been shown in FIGS. 16 and 17 containing the same transversely extending bar 59 and slot 61 but is further provided with positive engagement means such as the anchor pin or nib 66 projecting from the leading edge of the lug. Nib 66 is adapted to engage any one of several holes 67 or other openings formed through strap 68 as described earlier above, and in this manner, the perforations along the end region of the straps provide transverse lines of weakness laterally across strap 68 whereby the strap can more readily be bent at these predetermined positions.

Thus, each of the above two lugs includes a leading edge portion around which an end of the strap is folded or bent to conform thereto. The slot 61 at its position trailing (or behind) the leading edge portion holds the strap closely to the lug surface to permit the strap to be bent about the leading edge portion.

Figure 18:
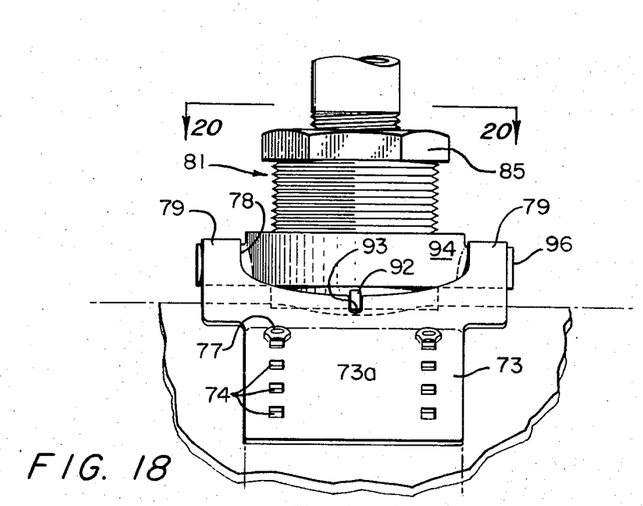
FIG. 18 is a side elevation view according to another embodiment of the invention.
Figure 19:
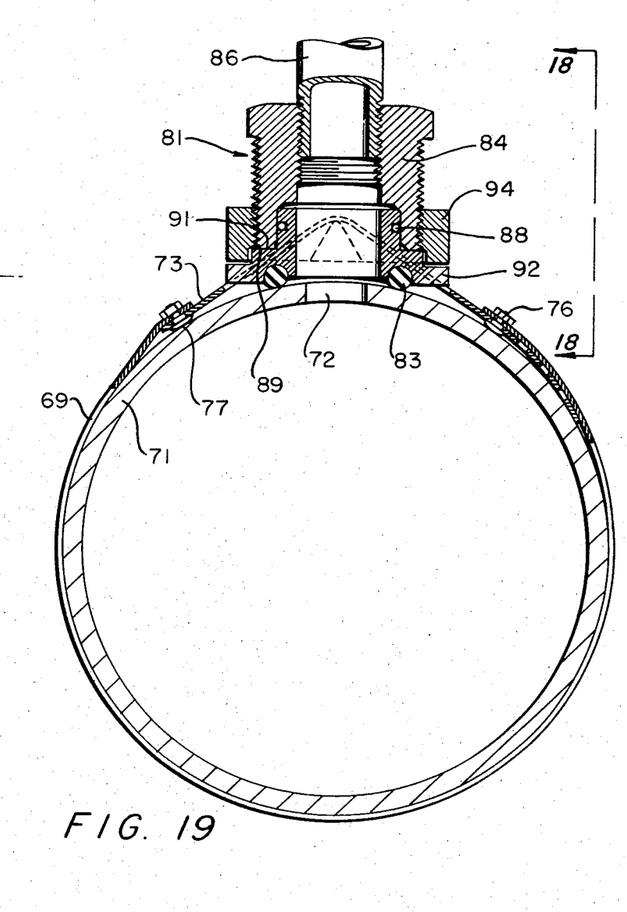
FIG. 19 is an end elevation view in section taken along the line 19—19 of FIG. 18.
Figure 20:
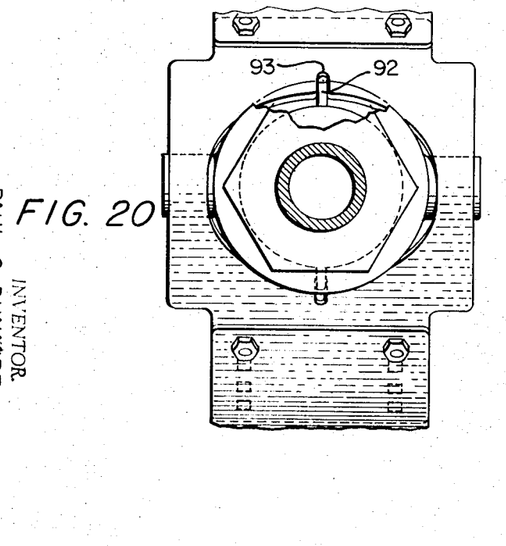
FIG. 20 is a plan view of FIG. 18 taken along the line 20—20 thereof.

Another embodiment of the invention is shown in FIGS. 18, 19 and 20 wherein the saddle unit further serves, additionally, to provide tightening of the flexible strap about the pipe line.

Accordingly, a flexible strap 69 encircles a run of pipe 71 formed with a flow passage 72 entering the pipe radially thereof.

Means for interconnecting the upper ends of strap 69 includes the flexible strap-extension collar 73 formed with a series of openings 74 aligned with openings 76 formed in the ends of strap 69. Thus, connecting bolts 77 can readily be inserted through adjacent aligned openings 74, 76.

Strap-extension collar 73 includes an intermediate portion characterized by a relatively large opening 78 and a pair of transversely extending lifting portions 79.

The saddle unit 81 comprises an annular compression element 82 arranged to compress an O-ring gasket 83 against that margin of pipe surface encircling the outer edge of passage 72.

Compression element 82 cooperates with an exteriorly threaded hollow hub 84 which, in turn, is tapped at its upper end, for example, to threadedly receive a pipe connection 86.

Figure 25:
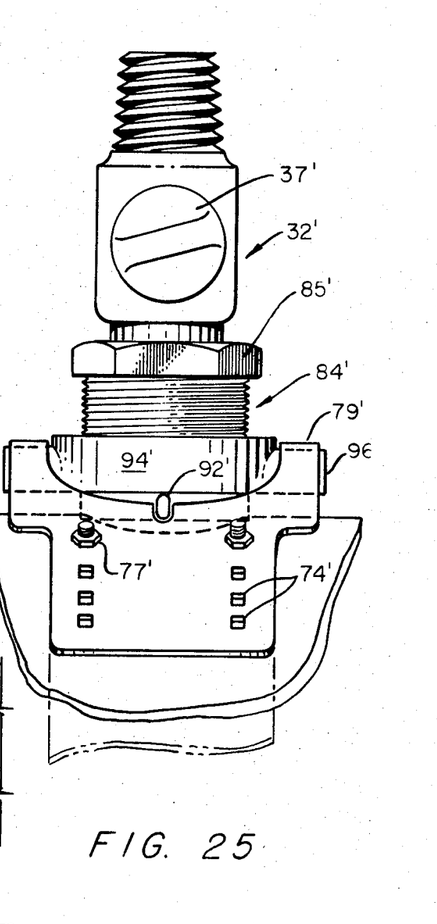
FIG. 25 is a side elevation view according to another embodiment employing a corporation stop in an arrangement similar to that shown in FIG. 18.

A variation of the embodiment as shown in FIGS. 18–20 consists of providing (FIG. 25) the lower end of a corporation stop with the exterior threads of hub 84 as well as the wrench flats 85 and counter-bored lower end as shown for hub 84 whereby a corporation stop can be simply and easily connected to the pipe run.

The exteriorly threaded hub 84 includes an enlarged cylindrical opening at its lower end adapted to receive a first cylindrical portion 87 therein in mutually rotatable relation. An O-ring 88 is carried about portion 87 so as to form a fluid seal between the movable cylindrical interface defined between hub 84 and the exterior of compression element 82.

The lower end 89 of hub 84 rides upon a transversely extending cylindrical shoulder 91 extending laterally outwardly of the exterior of element 82. In addition, element 82 includes positioning detents 92 which cooperate with notches 93 formed in the edge of collar opening 78 so as to prevent rotation of element 82 upon its sealing gasket 83.

Means for compressing gasket 83 includes the lifting collar 94 formed with diametrically oppositely extending fulcrum elements 96 which serve to support, from beneath, those transversely extending lifting portions 79 of the strap-extension collar 73. The interior of collar 94 is threaded to the exterior of hub 84.

In operation, it will be immediately apparent that hub 84 rides at all times in pressure-transmitting relation upon shoulder 91 of compression element 82. Thus, rotation of hub 84 serves to advance the lifting collar 94 upwardly along the threaded exterior of hub 84. As collar 94 progresses upwardly, it will be readily evident that the strap 69 becomes more tightly secured about pipe 71. As the tension in strap 69 increases, it will be further evident that the compression face defined beneath element 82 causes progressively greater compression of gasket 83. The force applied to gasket 83 is, as with the earlier embodiments, applied via the fulcrum elements 96 to evenly distribute sealing forces.

Figure 21:
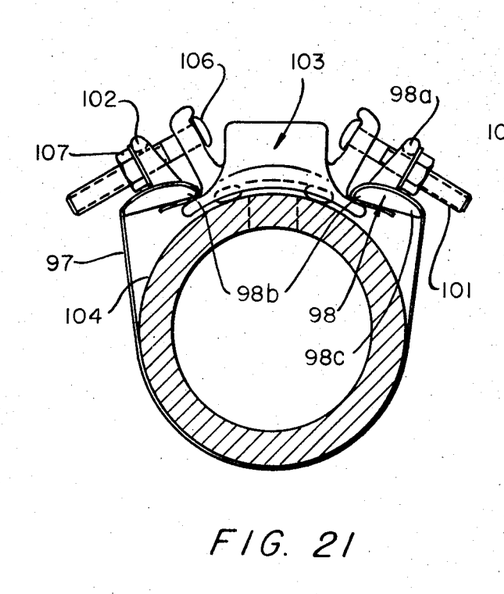
FIG. 21 is an end elevation view according to another embodiment of the invention.
Figure 22:
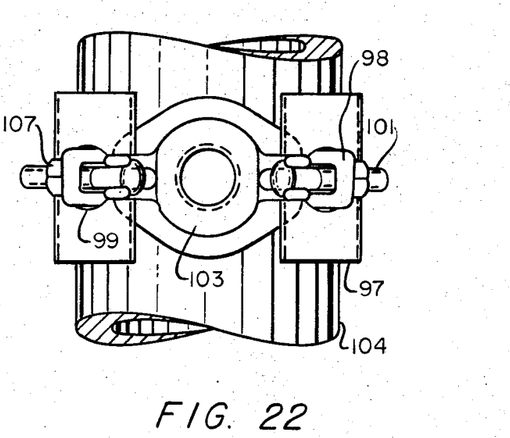
FIG. 22 is a plan view of FIG. 21.

Referring to FIGS. 21 and 22, another embodiment according to the invention has been disclosed characterized by a flexible strap 97 formed at its ends with under-folded portions to receive therein a lug element 98. Lug elements 98 are each provided with a single outwardly protruding portion 98a. Bolts 101 extend through passages formed within portions 98a and their heads 106 hook into slotted anchors 102 protruding upwardly from and cast integrally with a saddle unit 103. Nuts 107 engage the upwardly protruding portions 98a of lugs 98. Unit 103 includes, of course, a suitable resilient annular seal (not shown) interposed between its undersurface and the marginal surface about a flow passage to be formed into pipe 104.

It is to be further observed that the leading edge 98b of lugs 98 rests in a notch 100 in the skirt of unit 103 so as to bear against boss unit 103 and be rotated at a position beneath the axis of each bolt 101 whereby the point of contact of lugs 98 with boss unit 103 forms a pivot point about which the lugs may be rocked by tightening bolts 101. As they pivot, the trailing edge of the lugs will provide more take-up in the strap for each increment of advance of the nuts, by virtue of having a greater moment arm. In addition it is apparent that the leading edges of lugs 98, when drawn tightly against boss unit 103, serve to pinch the under-folded ends of strap 97 to maintain the strap firmly anchored.

Accordingly, in operation, it is a simple matter to tighten the nuts 107 on bolts 101 whereby through the moment arm defined through the outwardly protruding portions 98a, lugs 98 can be rocked about their leading edges 98b. In addition, it is apparent that the degree to which the lugs are rocked will be relatively small while simultaneously effecting considerable tightening of the strap 98. Note, for example, that the trailing portion 98c of lugs 98 extends a relatively considerable distance away from the pivot point defined along the leading edge portion 98b of the lugs. Thus, for only a slight arcuate movement of lugs 98, a considerable linear movement of the trailing portions 98c is developed.

From the foregoing, it will be further readily apparent that the number of component parts shown in the embodiment disclosed in FIGS. 21 and 22 becomes minimal whereby the expense involved in a saddle assembly of the above type becomes relatively small while the saddle assembly is suitable for use on a wide range of pipe lines.

According to another embodiment (see FIG. 26) a pipe saddle assembly 121 has been provided wherein an annular compression element 122 serves to compress a resilient seal 123 against that margin defined around an opening 124 to be formed transversely into the side of a pipe line 126.

Figure 26:
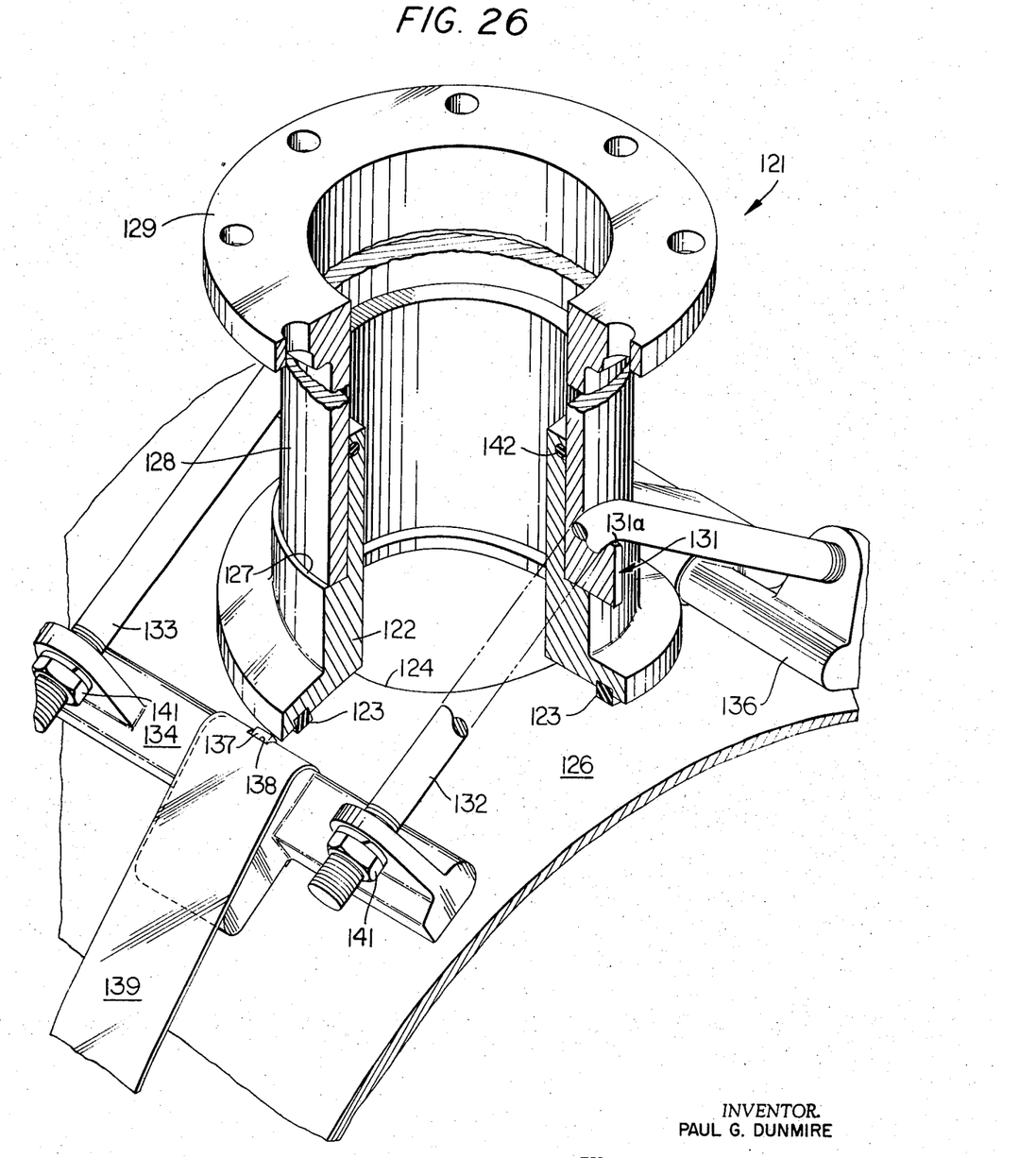
FIG. 26 is an enlarged perspective view, partially broken away, according to another embodiment wherein the tensioning harness serves to draw a pipe tightly into the saddle member to form a seal therebetween.

The annular compression element 122 is formed to include a pressure-receiving portion, such as the shoulder 127 formed exteriorly around element 122. An annular member is disposed to apply pressure to shoulder 127 as, for example, by means of various suitable connections such as the length of pipe 128 or other pipe-like connection, for example, formed with a flange 129 on one end for making connection to other pipe lines.

The member 129 is formed with a pair of rigid fulcrum elements 131 having a relatively sharp fulcrum edge 131a disposed along the opposite ends of a diameter of member 128 and across which a pair of bolts 132, 133 as described above may be disposed for applying downwardly acting (as shown in FIG. 26) forces to member 128 for transmitting such forces to the compression element 122 whereby seal 123 becomes compressed against the outer surface of pipe line 126.

In order to complete the embodiment shown in FIG. 26 there is, of course, provided a pair of lugs 134, 136 of the type described above including a protruding nib 137 arranged to project through an opening 138 formed in the ends of a flexible strap 139.

As thus arranged, the tightening of nuts 141 in the region of the saddle assembly 121 serves to draw the fulcrum element 131 downwardly along with the pipe-like member 128. This downward force is, of course, transmitted to the compression element 122 in the manner above described.

In order to provide a suitable fluid seal between element 122 and member 128 and O-ring 142 encircles the upper end of compression element 122 so as to form a seal with the interior surface of pipe-like member 128.

In the foregoing constructions the forces used to attach the saddle units to a pipe are evenly applied about the pipe except at the sealing gasket; and in the region of the sealing gasket, all of the forces have been concentrated to force the gasket straight against the pipe while being evenly distributed about the gasket to minimize the chance of leaks.

I claim:

1. A pipe assembly for use in making a tightly sealed connection to a fluid passage formed transversely into a pipe line comprising a flexible strap to be disposed about the pipe, boss means formed with a flow passage to be aligned with said fluid passage, a resilient sealing element disposed between the bottom of the boss means and that annular margin surface of the pipe encircling said fluid passage, rigid fulcrum elements carried by said boss means and having a narrow support edge extending in the direction of the pipe, means interconnecting the ends of said strap, said interconnecting means engaging said fulcrum elements for transmitting tightening forces to said boss means via said fulcrum elements to urge said boss means toward said sealing element, tightening means cooperating with said interconnecting means for tightening the strap about the pipe, said boss means being free to adjust relative to said interconnecting means and said sealing element to evenly distribute around said sealing element those compressive forces applied thereto while distributing compressive forces about the pipe periphery via said strap.

2. A pipe saddle assembly according to claim 1 wherein said fulcrum elements lie substantially along an extension of the opposite ends of a diameter of the flow passage of the boss means and in a plane including the axis of the pipe.

3. A pipe saddle assembly according to claim 1 wherein said means interconnecting the ends of said strap comprises individually adjustable bolt means adjacent said boss means and interconnecting the ends of said strap, and wherein said tightening means includes nuts threadedly engaging the ends of said bolts.

4. A pipe saddle assembly according to claim 1 wherein said boss means includes an annular compression element formed to be aligned with said flow passage, said compression element serving to compress said seal to said pipe line and having a pressure receiving portion, a member disposed for applying pressure to said pressure receiving portion, said fulcrum elements protruding from said member, means disposed across said fulcrum elements and interconnecting the ends of the strap whereby tightening the strap causes said member to apply increasingly compressive forces to said seal via said fulcrum elements.

5. A pipe saddle assembly according to claim 4 wherein said member consists of a hollow pipe-like fluid connection formed with said fulcrum elements.

6. A pipe saddle assembly according to claim 5 further including a fluid seal interposed between said hollow pipe-like fluid connection and said compression element.

7. A pipe saddle assembly according to claim 4 wherein said member consists of a collar formed with said rigid fulcrum elements and threadedly engaging the boss means whereby rotation of the latter causes the collar to raise the fulcrum elements along the boss means while the latter applies pressure upon said pressure receiving portion of said compression element.

8. A pipe saddle assembly according to claim 1 wherein said boss means includes an annular compression element formed to include a portion of said flow passage, said compression element having an undersurface for pressing against said seal and a pressure receiving portion formed around its exterior, and exteriorly threaded member bearing against said pressure portion and including a portion of said flow passage, said threaded member being adapted to be rotated relative to said compression element, and a collar formed with said fulcrum elements protruding therefrom, means interconnecting the ends of the strap disposed across said fulcrum elements, said collar threadedly encircling said threaded member to be drawn upwardly therealong during rotation of said threaded member while said collar is held from rotating by said attachable means disposed across said fulcrum elements.

9. A pipe saddle assembly according to claim 8 further including an O-ring interposed between said compression element and said exteriorly threaded member to form a fluid seal therebetween.

10. A pipe saddle assembly according to claim 1 wherein said means for interconnecting the ends of the strap includes end portions of the strap each folded under to dispose the strap end portion between the pipe and the strap, lugs disposed in the folds and formed to include bolt-receiving passages, bolts in the passages for drawing the folded ends of the strap toward each other to tighten the strap, said lugs serving to press against the under-folded ends and retain same pinched against the pipe.

11. A pipe saddle assembly according to claim 10 wherein portions of the undersurface of the lugs are formed and adapted to ride in contact upon the wall of the pipe at positions flanking said under-folded strap ends so as to stabilize the lugs in the region of the boss means.

12. A pipe saddle assembly according to claim 1 wherein said boss means includes an outer flared portion closely adjacent the bottom of the boss and formed to include an inclined wedging portion on opposite sides of the boss, said wedging portions lying intermediate said fulcrum elements, and said means for interconnecting the ends of the strap includes end portions of the strap folded under to dispose the folded end portion of the strap between the pipe and the unfolded portion of the strap, lugs disposed in the folds and formed to include bolt-receiving passages, bolts in the passages and threaded for nuts to draw the folded ends of the strap toward the boss means to tighten the strap, said lugs being disposed to contact and press the under-folded strap end portions against said wedge portions to retain same pinched thereagainst and to apply localized compressive sealing forces to said boss means via said wedging portions to aid in compressing said seal against said pipe.

13. In a pipe saddle assembly for making a tightly sealed connection to a fluid passage formed transversely into a pipe line comprising a flexible strap to be disposed about the pipe, the ends of said strap being disposed on one side of the pipe and folded under to dispose the end portions of the strap between the pipe and the strap, lugs disposed in the folds formed at the ends and formed to include projecting portions having bolt-receiving passages, a saddle member formed with a flow passage therein to be aligned with said fluid passage, a resilient seal between the bottom of the saddle and that annular margin of the pipe encircling said fluid passage, a pair of rigid elements supported by said saddle member, a projecting lug portion on each lug disposed between the lug an said saddle member to project toward said saddle member and the under-folded ends of said strap each include an opening through the strap for receiving a said projecting lug portion therethrough, bolts in said bolt-receiving passages and engaging said rigid elements for interconnecting the ends of said strap, and nuts carried on said bolts adjacent the saddle member and pipe for tightening said strap about the pipe to compress said seal between said saddle member and the pipe.

14. A pipe saddle assembly for making a tightly sealed connection to a fluid passage formed transversely into a pipe line comprising a flexible strap for engaging the pipe, the ends of said strap being disposed at one side of the pipe, boss means formed with a flow passage therein to be aligned with said fluid passage, a resilient seal between the bottom of the boss means and that annular margin of the pipe encircling said fluid passage, a pair of rigid elements carried by said boss means and extending in the direction of the pipe for receiving compressive sealing forces locally applied thereto, means extending across said rigid elements for interconnecting the ends of said strap, the last named means including rigid portions bearing against said rigid elements and means at said side of the pipe cooperating with the last named said means for tightening the strap about the pipe to cause said rigid portions to bear against and compress said seal between said boss and the pipe, the last named means acting upon said boss means via said rigid elements to localize the application of forces thereto substantially at the extensions of a diameter of said flow passage while evenly distributing compressive forces about the pipe periphery via said strap.

15. A pipe saddle assembly according to claim 14 wherein lugs are coupled to the ends of said strap, said lugs having a pair of upper portions formed with bolt receiving passages therethrough, a pair of downwardly extending pivot arms for engaging said rigid elements to pivot therefrom, and adjustable elongated bolts disposed to extend between said lugs for drawing said lugs toward each other to tighten the strap while the pivoting ends of said pivot arms apply compressive forces locally to the boss means in the region of said rigid elements.

16. A saddle assembly comprising an elongated, thin, flexible strap adapted to encircle a pipe line, the ends of said strap being disposed to be drawn toward each other, lugs to be coupled to the ends of the strap and having radially outwardly protruding portions formed to include bolt-receiving passages therethrough for interconnecting the ends of the strap, said lugs having a leading edge portion around which an end of said strap is folded to conform thereto, a slot formed in said lug at a position trailing behind the leading edge and dimensioned and formed to pass an end of said strap therethrough in relatively closely spaced relation to the thickness of the strap to permit the leading end portion of said strap to be bent about said leading edge while retaining trailing portions thereof from above, each of the lugs lying in the fold of an end of the strap, bolts extending through said passages for drawing said ends toward each other to tighten the strap, and boss means including a resilient annular seal disposed between the bottom of the boss and the pipe held by said strap to the pipe, said boss means including a flow passage therethrough for alignment with a transverse opening in the pipe.

17. A saddle assembly according to claim 16 further wherein an end of said strap includes a series of holes formed therethrough, and a projecting nib fixed to the leading edge of one of said lugs for engaging a selected one of said holes.

18. A saddle assembly comprising an elongated, thin, flexible strap adapted to encircle a pipe line, the ends of said strap being disposed to be drawn toward each other, lugs to be coupled to the ends of the strap and having radially outwardly protruding portions formed to include bolt-receiving passages therethrough for interconnecting the ends of the strap, said lugs having a leading edge portion, an end of said strap being folded to conform thereto, the lugs lying in the fold of an end of the strap, bolts extending through said passages for drawing said ends toward each other to tighten the strap, and boss means including a resilient annular seal disposed between the bottom of the boss means and the pipe, said boss means including a flow passage therethrough for alignment with a transverse opening in the pipe, said bolts flanking said boss means for adjusting compressive forces applied to said seal along the pipe, a forwardly projecting nib extending away from said leading edge and fixed thereto, and an opening formed through said strap in the region of said fold to be engaged by said nib to retain said strap.

19. A pipe saddle assembly adapted for use in making a sealed connection with a pipe having a flow passage therein and having an opening in the wall of the pipe in communication with the flow passage, said assembly comprising a saddle member having a bore therein forming a flow passage and adapted to be mounted on the wall of the pipe so that the bore therein is in general registration with said opening in the pipe, resilient sealing means adapted to be disposed between the saddle and the wall of the pipe to form a fluid-tight seal between the saddle and the wall of the pipe, a pair of rigid fulcrum elements carried by said saddle and disposed on opposite sides of the bore and extending radially of the bore, said fulcrum elements having a narrow support edge extending in the direction of the pipe, a flexible strap-like element adapted to engage the side of the pipe, adjustable means disposed across and engaging said support edges of the fulcrum elements on said saddle and coupled to the ends of said strap-like element for applying forces to said saddle through said narrow support edges of said fulcrum elements to thereby apply relatively equally distributed forces to said resilient sealing means.

20. A pipe saddle assembly according to claim 19 wherein said saddle member has a second pair of fulcrum elements disposed on said opposite sides of the bore but above the level of said first pair.

* * * * *